(12) United States Patent
Schorn et al.

(10) Patent No.: US 8,196,716 B2
(45) Date of Patent: Jun. 12, 2012

(54) CALIPER FOR A DISK-BRAKE

(75) Inventors: Michael Schorn, Camparada (IT);
Giovanni Mario Tironi, Dalmine (IT);
Enrico Battista Ongaretti, Stezzano
(IT); Paolo Sala, Villa D'Adda (IT)

(73) Assignee: Freni Brembo S.p.A., Bergamo (IT)

( * ) Notice: Subject to any disclaimer, the term of this patent is extended or adjusted under 35 U.S.C. 154(b) by 863 days.

(21) Appl. No.: 10/584,694

(22) PCT Filed: Dec. 30, 2003

(86) PCT No.: PCT/IT03/00869
§ 371 (c)(1),
(2), (4) Date: May 10, 2007

(87) PCT Pub. No.: WO2005/064192
PCT Pub. Date: Jul. 14, 2005

(65) Prior Publication Data
US 2008/0023276 A1   Jan. 31, 2008

(51) Int. Cl.
*F16D 55/00* (2006.01)
(52) U.S. Cl. .................. 188/73.47; 188/71.1; 188/72.5; 188/370
(58) Field of Classification Search .............. 188/71.1, 188/72.1, 72.4, 72.5, 73.47, 370; D12/180
See application file for complete search history.

(56) References Cited

U.S. PATENT DOCUMENTS

| | | | | |
|---|---|---|---|---|
| 3,261,429 A | * | 7/1966 | Burnett et al. | 188/72.5 |
| 3,730,306 A | * | 5/1973 | Rath | 188/345 |
| 3,734,248 A | * | 5/1973 | Fay | 188/345 |
| 3,841,444 A | * | 10/1974 | Baum et al. | 188/72.3 |
| 4,709,789 A | * | 12/1987 | Czich et al. | 188/73.44 |
| 5,002,160 A | * | 3/1991 | Weiler et al. | 188/71.6 |
| 5,277,279 A | * | 1/1994 | Shimura | 188/72.5 |
| 5,282,521 A | * | 2/1994 | Leist et al. | 188/73.47 |
| 5,467,847 A | * | 11/1995 | Antony et al. | 188/73.39 |

(Continued)

FOREIGN PATENT DOCUMENTS

EP   1016804   12/1998

(Continued)

OTHER PUBLICATIONS

International Search Report—Dec. 30, 2003.

*Primary Examiner* — Robert A Siconolfi
*Assistant Examiner* — Mariano Sy
(74) *Attorney, Agent, or Firm* — Sofer & Haroun, LLP

(57) ABSTRACT

A caliper for a disc-brake includes two side walls at a distance from each other which delimit a space to accommodate a portion of a brake disc. The side walls are connected to each other by a connecting structure which straddles the disc space. Each of the side walls delimits at least one seating capable of accommodating a pad. The caliper comprises a thrust to clamp the pads against the brake disc. The thrust is secured to the side walls in such a way that the side walls absorb the entire clamping force and the seatings are capable of securing the pads so that the side walls also absorb the entire braking moment. The connecting structure comprises arc-shaped shells, connected so as to be integral with both the side walls. The slenderness of the shells expressed as the ratio of thickness to circumferential extension relative to an axis of rotation of the brake disc is less than 17/100.

22 Claims, 3 Drawing Sheets

U.S. PATENT DOCUMENTS

| | | | |
|---|---|---|---|
| 5,535,856 A * | 7/1996 | McCormick et al. | 188/73.36 |
| 5,538,105 A * | 7/1996 | Rike | 188/73.32 |
| 5,558,183 A * | 9/1996 | Way | 188/71.6 |
| 5,613,577 A * | 3/1997 | Collin | 188/72.4 |
| 5,979,611 A * | 11/1999 | Sasaki et al. | 188/73.43 |
| 6,039,155 A * | 3/2000 | Demoise, Jr. | 188/73.39 |
| 6,367,595 B1 * | 4/2002 | Mori et al. | 188/73.1 |
| 6,446,766 B1 * | 9/2002 | Cornolti et al. | 188/71.6 |
| 2004/0188188 A1 * | 9/2004 | Barbosa et al. | 188/71.1 |

FOREIGN PATENT DOCUMENTS

| | | |
|---|---|---|
| EP | 1069332 | 1/2001 |
| WO | WO03071151 | 8/2003 |

* cited by examiner

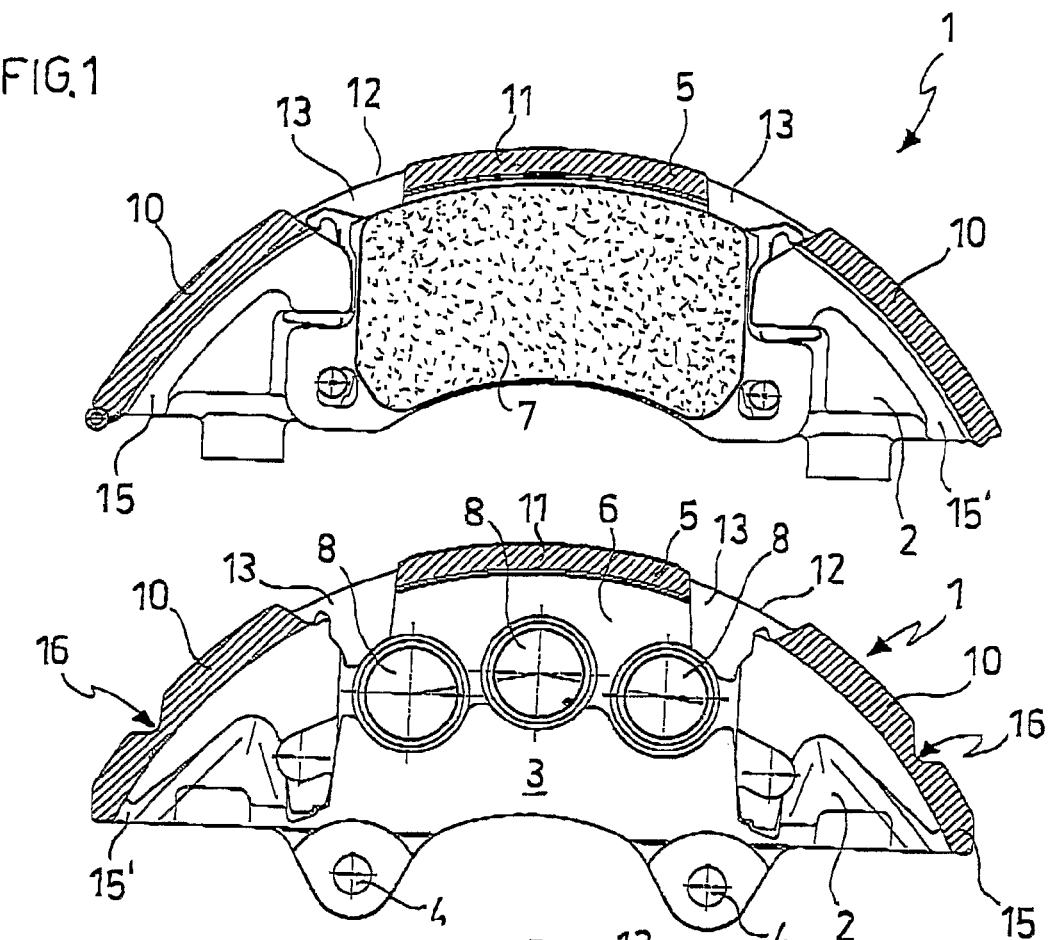
FIG.1
FIG.2
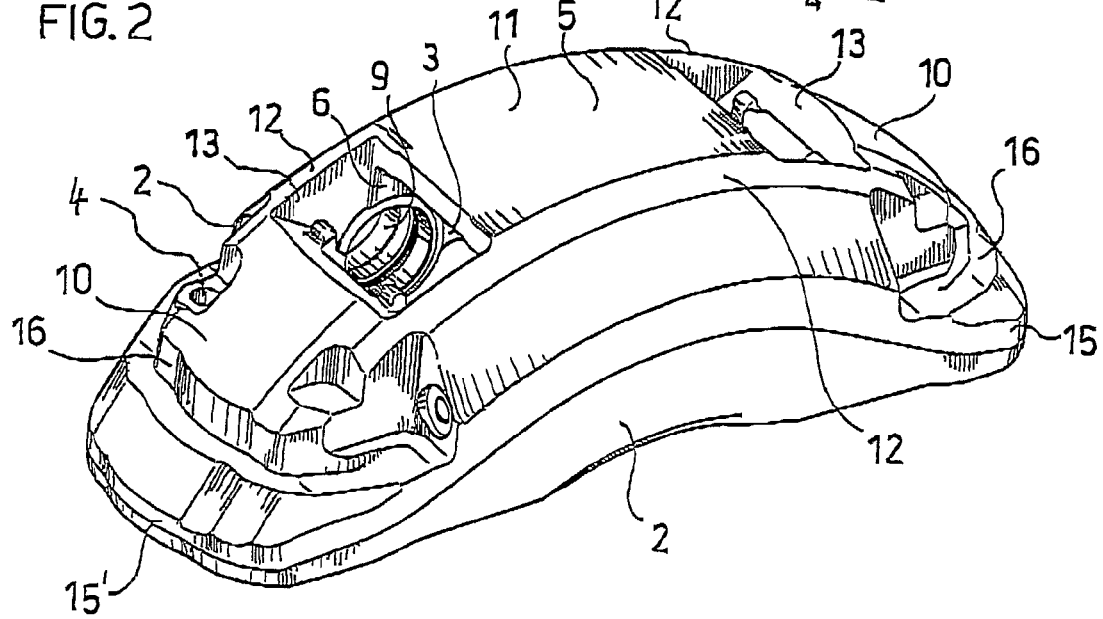
FIG.3

CALIPER FOR A DISK-BRAKE

RELATED APPLICATIONS

The present application is a national phase application of PCT/IT2003/000869 which was filed on Dec. 30, 2003, the entirety of which is incorporated herein by reference.

FIELD OF THE INVENTION

The subject of the present invention is a caliper of the fixed type for a disc-brake.

BACKGROUND OF THE INVENTION

There are known fixed caliper disc-brakes in which a caliper body comprises two walls arranged on both sides of the brake disc and connected to each other by means of two or more connecting bridges which straddle the disc. Typically, the two walls are joined together by connecting screws accommodated inside the connecting bridges. The wall of the caliper body facing towards the inside of the vehicle comprises two holes to accommodate respective attachment screws to attach the caliper body to the vehicle suspension so that it is integral in rotation and in translation. In both walls of the caliper body a seating is made to accommodate a pad having a lining of friction material facing towards the brake disc and at least one of the walls delimits one or more seatings for hydraulic cylinder/piston units capable of clamping the pads against the brake disc to generate the braking force.

During braking, the body of a fixed caliper is subjected to a highly complex system of forces. The force of reaction to the axial clamping of the disc involves an axial tensile force in the connecting bridges, a bending moment in the walls about an axis substantially radial relative to the axis of rotation of the brake disc and a bending moment of reaction in the connecting bridges, which is also substantially about an axis substantially radial to the axis of rotation of the disc.

The braking force transmitted by friction from the brake disc to the pads and from these through the caliper body to the vehicle suspension involves further torsional and shear loads on the caliper body. The result of this, in addition to a large shear force, is a further bending moment in the connecting bridges. This state of three-dimensional loads on the caliper body during braking results in substantial deformation and distortion of the body. This means that it is necessary to oversize both the caliper body itself and the suspension at the points at which the caliper is attached in order to prevent relative axial motion of the two attachment points so as to limit the distortion of the caliper body.

Adequate dimensioning of the caliper means that it must be large in size to contain the deformation within the predefined limits.

While calipers of the floating type, supported so that they can slide axially and subjected to a simpler state of force and deformation, are able to compensate for deformation by means of relative motion of the attachment points along the sliding pins, the tendency towards excessive distortion of fixed calipers is manifested in overloading of the suspension, a risk of the pads becoming jammed or wedged and uneven wear of the friction lining of the pads.

The purpose of the present invention is therefore to make available a fixed caliper which can be secured axially to a vehicle at two or more points having characteristics such as to obviate the disadvantages cited with reference to the known technology.

SUMMARY OF THE INVENTION

This purpose is achieved by means of a caliper for a disc-brake comprising two side walls at a distance from each other which delimit a space to accommodate a portion of a brake disc, in which one of said two side walls comprises means for attaching the caliper to a vehicle so that it is integral in rotation and in translation and the walls are connected to each other by means of a connecting structure which straddles the space provided for accommodating the portion of the brake disc, in which each of said walls delimits at least one seating capable of accommodating at least one pad and in which the caliper comprises thrust means capable of forcing the pads against the brake disc to clamp it, said thrust means being secured to said walls in such a way that the walls absorb the entire clamping force and said seatings for the pads being capable of securing the pads in such a way that the walls also absorb the entire braking moment which can be applied by the pads to the brake disc by friction, in which said connecting structure comprises one or more shells, arc-shaped or arranged along an arc, integral with both the walls along outer circumferential edges thereof, in which the slenderness of each of said one or more shells, expressed as the ratio of thickness to circumferential extension relative to the axis of rotation of the brake disc is less than 17/100.

BRIEF DESCRIPTION OF THE FIGURES

For a better understanding of the present invention, some forms of embodiment are given by way of non-limiting example with reference to the appended drawings, in which:

FIG. 1 is a view in longitudinal section of a caliper for a disc-brake according to a first form of embodiment of the invention;

FIG. 2 is a view in longitudinal section of a caliper for a disc-brake according to a second form of embodiment of the invention;

FIG. 3 is a view in perspective of the caliper shown in FIG. 2;

DESCRIPTION OF THE PREFERRED EMBODIMENTS

Figure 4:
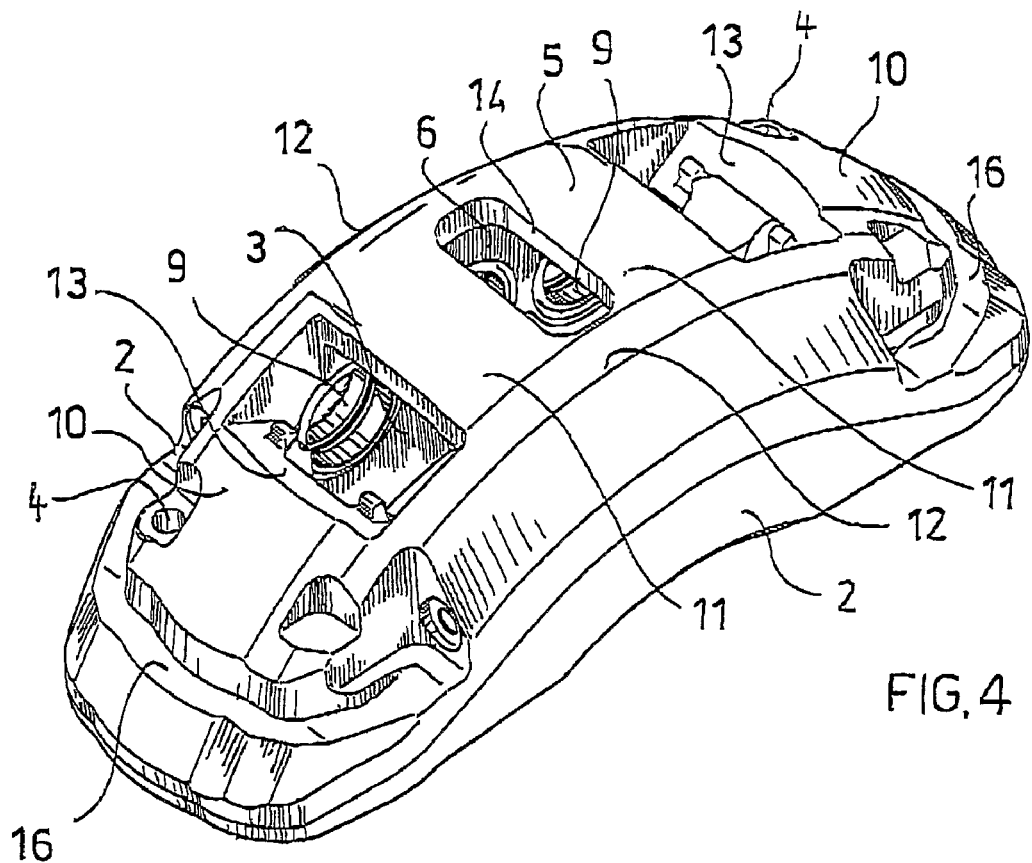
FIG. 4 is a view in perspective of a caliper according to a further form of embodiment of the invention.

With reference to the drawings, a fixed caliper for a disc-brake is indicated as a whole by the reference number 1. The caliper 1 comprises two side walls 2 at a distance from each other which delimit a disc space 3 to accommodate a portion of a brake disc (not shown). One of said side walls 2 comprises means for attaching the caliper 1 to a vehicle (not shown), in particular to the suspension of the vehicle, so that it is integral in rotation and in translation.

For example, these attachment means are embodied as at least two holes 4 delimited by said side wall 2. The holes 4 are spaced apart from each other and capable of accommodating respective attachment screws.

The walls 2 are connected to each other by means of a connecting structure 5 which straddles the disc space 3 and each of the walls 2 delimits at least one seating 6 to accommodate a pad 7.

The caliper 1 also comprises thrust means, for example one or more hydraulic cylinder/piston units 8, located in seatings 9 made in the side walls 2 and capable of forcing the pads 7 against the brake disc (not shown) to clamp it.

The thrust means, in particular the hydraulic cylinder/piston units 8 or, alternatively, linear motors, are secured to the side walls 2 in such a way that the latter absorb the entire clamping force and the above-mentioned seatings 6 for the pads 7 are arranged to secure the pads 7 in such a way that the side walls 2 also absorb the entire braking force or tangential force transmitted by the pads 7 to the brake disc by friction.

The above-mentioned connecting structure 5 comprises one or more shells 10, 11 in the form of an arc or arranged along an arc, rigidly connected to and preferably in one piece with both the side walls 2 along outer circumferential edges 12 thereof, in which the slenderness of said one or more shells 10, 11, expressed as the ratio of thickness to circumferential extension relative to the axis of rotation of the brake disc is less than 17/100.

In the present description of the forms of embodiment of the invention, the terms "circumferential", "axial" and "radial" used to indicate direction and position are relative to the axis of rotation of the brake disc. This axis of rotation is aligned transversely, generally in a manner substantially perpendicular relative to the planes in which the side walls 2 lie.

According to one form of embodiment, the shells 10, 11 delimit one or more through openings 13, 14. In order to obtain high rigidity for the shell-type connecting structure 5, 10, 11, it is advantageous and important to limit the total area of opening of said through openings 13, 14 to a value of less than 40% of the total area of the connecting structure 5, that is to say of the area of said one or more shells 10, 11 including that of the through openings 13, 14.

Preferably, said total area of opening of the through openings 13, 14 is between 10% and 30%, still more preferably between 15% and 25% of the total area of the one or more shells 10, 11 including that of the through openings 13, 14.

The slenderness of the entire connecting structure 5, formed by said one or more shells 10, 11, including the through openings 13, 14, expressed as the ratio of thickness to circumferential extension relative to the axis of rotation of the brake disc is advantageously between 2/100 and 4/100, preferably approximately 3/100

According to an advantageous form of embodiment, the slenderness of the shells 11, expressed as the ratio of thickness to extension of the shells 10, 11 between said through openings 13 in a circumferential direction relative to the axis of rotation of the brake disc is between 5/100 and 17/100, preferably approximately 10/100.

According to a preferred form of embodiment, the connecting structure 5, 10, 11 in the form of a shell extends substantially along an arc of circle having a radius of 180 mm to 270 mm, preferably from 190 mm to 210 mm, in which the average thickness of the shell or shells is less than 20 mm, advantageously between 5 mm and 15 mm, still more advantageously approximately 12 mm.

The connecting structure 5 provides particularly high rigidity in the case where, in combination with the slenderness and extension characteristics of the individual shells 10, 11 described above, said shell-type connecting structure 5 extends along an arc of circle of between 90° and 180°, preferably between 100° and 130°, still more preferably approximately 125°.

According to one form of embodiment, the side walls 2 have a curved shape, concave viewed from the disc space 3, in such a way that the distance between the end portions of the two walls 2 is less than the distance between the central portions of the two walls 2. Consequently the axial extension of the connecting structure 5 at said end portions is less than the axial extension of the connecting structure 5 at the central area of the walls 2. In this case, the slenderness of the one or more shells 11 in the central area or the area of the seatings 6 for the pads 7, expressed as the ratio of thickness to axial extension relative to the axis of rotation of the brake disc is between 3/35 and 10/35, preferably between 5/35 and 7/35 while the slenderness of the shells 10 in the areas of the walls 2 outside the seatings 6 for the pads 7, expressed as the ratio of thickness to axial extension relative to the axis of rotation of the brake disc is between 2/7 and 5/7, preferably 3/7.

Advantageously, the thickness of the shell/shells 10, 11 is substantially constant along the entire circumferential extension of the connecting structure 5 and preferably, said thickness of the shell/shells 10, 11 is substantially constant along the entire axial extension of the connecting structure 5.

The connecting structure 5 or the shells 10, 11 are advantageously formed in one piece with said side walls 2, for example by casting.

According to yet another form of embodiment, the connecting structure 5 comprises a single shell 10 which delimits at least one, preferably three through openings 13, 14, substantially circular, equidistant from each other in a circumferential direction relative to the axis of rotation of the disc and arranged halfway between the two side walls 2.

Advantageously, these three through openings 13, 14 are arranged in the area of the caliper 1 in which the seatings 6 for the pads 7 are also located.

According to the form of embodiment given in FIGS. 1 to 3, the connecting structure 5 comprises:
  two outer shells 10 arranged at the two opposite ends 15, 15' of the caliper 1, viewed in a circumferential direction of the brake disc, which connect respective ends of the side walls 2;
  a central shell 11, arranged approximately halfway between said outer shells 10, which connects the side walls 2 in the area of the seatings 6 for the pads 7 in which the connecting structure 5 delimits, between said central shell 11 and each of said side shells 10 a through opening 13 having a circumferential extension less than the circumferential extension of the adjacent shells 10, 11.

Advantageously, the circumferential extension of each of said through openings 13 is less than or equal to half the circumferential extension of each of the adjacent shells 10, 11.

Preferably, these through openings 13 are substantially rectangular with the edges and corners chamfered or rounded.

According to one form of embodiment, the thickness of the central shell is less than the thickness of the outer shells.

According to a further development of the form of embodiment cited above, the central shell 11 delimits a further through opening 14 arranged approximately at the centre of said central shell 11. The circumferential extension of the further through opening 14 is less than that of each of the remaining portions of the central shell 11.

The above through openings 13, 14 are suitable for providing cooling of the brake disc and also for routeing data transmission cables, for example for a device to indicate pad wear, not shown in the drawings.

The connecting structure 5 is therefore a shell structure or in other words a structure with a sufficiently thin wall and a sufficiently large surface extension to transmit between the side walls 2 both the force of reaction to the axial thrust of the thrust means (hydraulic pistons 8) and the actual braking force as a shell or shear wall structural system instead of transmitting these forces as a frame system with rigid nodes and beams as is the practice in solutions using known technology.

Despite the relative thinness or slenderness of the shells 10, 11, it is possible and advantageous to make, preferably on the radially outer side of one of said shells 10, 11, a groove 16 capable of accommodating a pipe (not shown in the drawings) for fluid to pass between the hydraulic cylinders 8 arranged in the two side walls 2.

According to the forms of embodiment shown in FIGS. 2, 3 and 4, both the outer shells 10 have such a groove 16 to accommodate respective pipes for fluid to pass through.

In order to obtain still higher resistance to distortion of the caliper 1, the circumferential extension of at least one of said shells 10, 11 is at least double that of its axial extension relative to the axis of rotation of the disc.

It is also advantageous to produce the shells 10, 11 in such a way that they have a double curvature, concave viewed from the disc space 3, which on the one hand forms an arc which straddles the disc space 3 transversely to the plane in which the brake disc lies and, on the other an arc which lies precisely in said plane of the brake disc.

Figure 5:
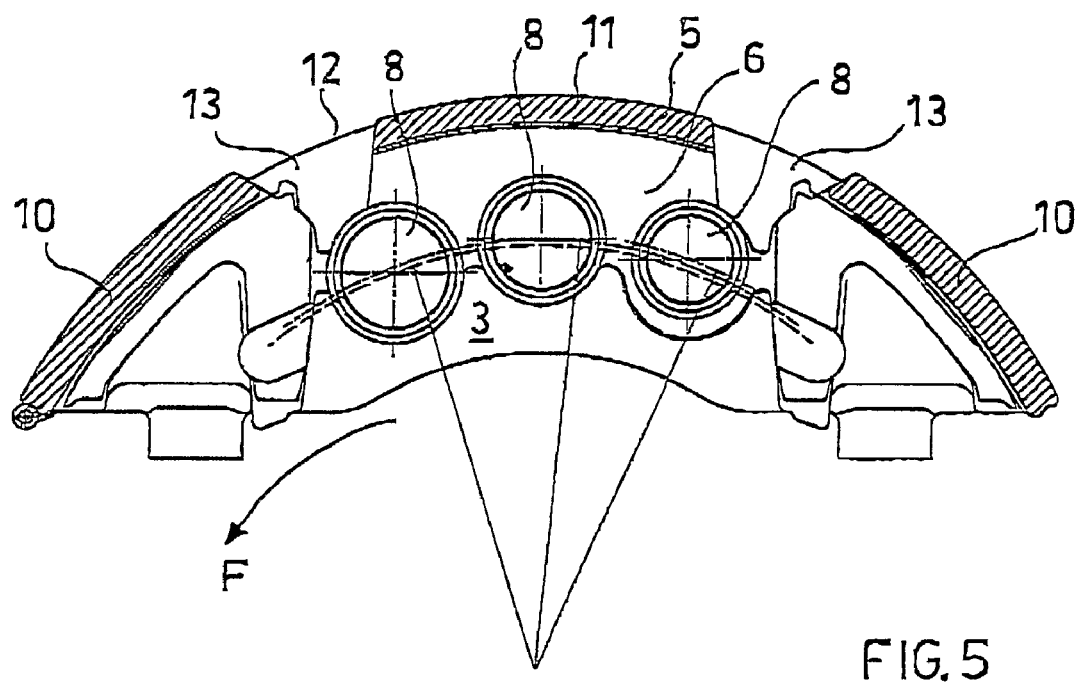
FIG. 5 is a view in longitudinal section of a caliper according to yet another form of embodiment of the invention.
Figure 6:
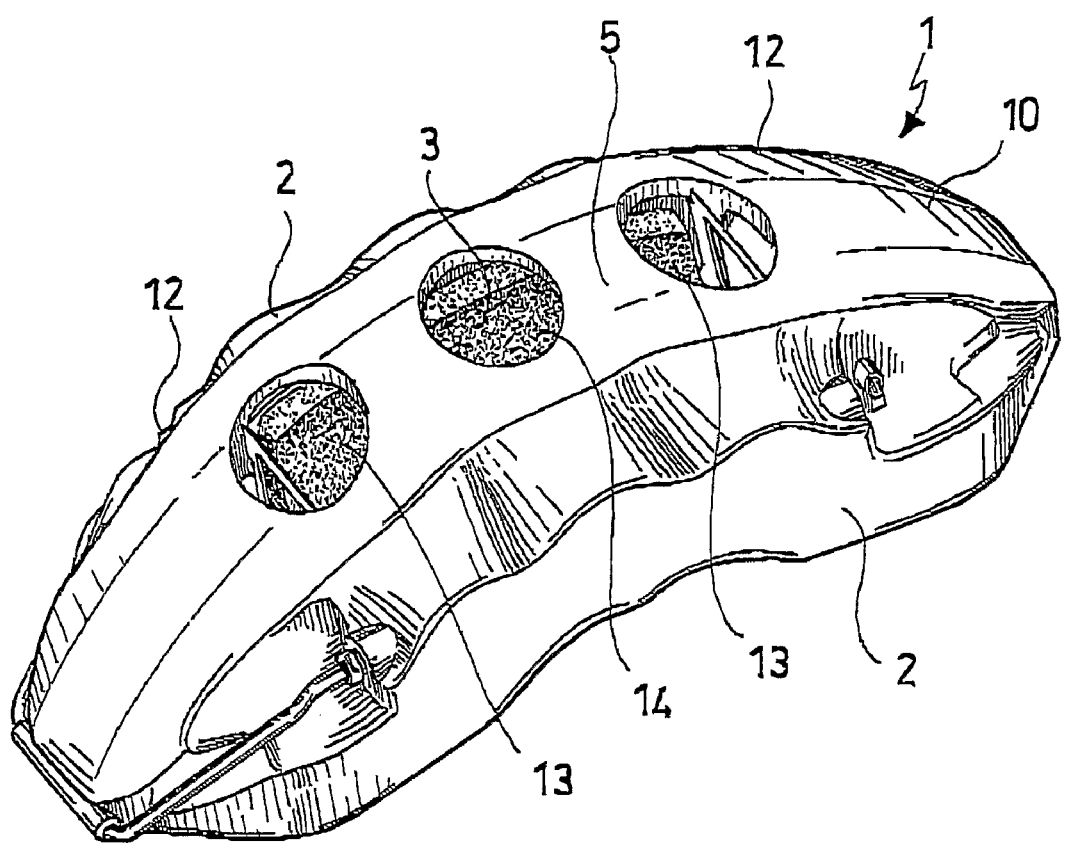
FIG. 6 is a view in perspective of a caliper according to yet another form of embodiment of the invention.

According to one form of embodiment, each of the two side walls 2 of the caliper 1 delimits three seatings 9 for hydraulic cylinder/piston units 8, in which said three seatings 9 are arranged on different circumferences relative to the axis of rotation of the brake disc. In particular, the three seatings 9 are arranged on circumferences with radiuses decreasing in the direction of movement of the disc corresponding to forward travel of the vehicle, indicated by the arrow F in FIG. 5.

The caliper 1 according to the present invention has high resistance to deformation due to superimposition of the force of reaction to the axial clamping of the brake disc and the braking force since, because of the formation of the arc-shaped shell connecting structure with the characteristics specified above, it is subjected to a state of shear loading favourable to stiffening the entire caliper.

In addition to the high rigidity, the shell type connecting structure allows the weight and size of the caliper to be reduced for a given brake disc diameter. Consequently, a caliper is obtained which is sufficiently rigid and smaller in size radially, allowing larger diameter discs to be used.

Clearly, a person skilled in the art, for the purpose of meeting incidental and specific requirements, will be able to make further changes and produce further variants to the caliper according to the present invention, without thereby departing from the scope of protection of the invention as defined in the following claims.

What is claimed is:

1. A fixed caliper for a disc-brake comprising two side walls at a distance from each other which delimit space suitable to accommodate a portion of a brake disc, in which one of said side walls comprises means for attaching the caliper to a vehicle so that said caliper is integral in rotation and in translation and the side walls are connected to each other by means of a connecting structure which straddles the disc space, in which each of said side walls delimits at least one seating capable of accommodating at least one pad and in which the caliper comprises thrust means capable of forcing the pads against the brake disc to clamp the pads, said thrust means being secured to said side walls in such a way that said side walls absorb the entire clamping force and said seatings being capable of securing the pads in such a way that the side walls also absorb the entire braking force applicable by the pads to the brake disc by friction, in which said connecting structure comprises one or more shells, arc-shaped or arranged along an arc, formed as a single integral structure having both side walls along outer circumferential edges thereof, in which the slenderness of said one or more shells expressed as the ratio of thickness to circumferential extension of said one or more shells relative to an axis of rotation of the brake disc is less than 17/100, wherein the radial thickness of all shells forming said connecting structure is constant along the entire circumferential extension of said connecting structure; and wherein said one or more shells delimit one or more through openings, in which the total area of opening of said through openings is less than 40% of the total area of the one or more shells including that of said through openings in which the slenderness of the entire connecting structure formed by said one or more shells, including the through openings, expressed as the ratio of thickness to circumferential extension of said entire connecting structure relative to the axis of rotation of the brake disc is between 2/100 and 4/100.

2. A fixed caliper according to claim 1, in which said total area of opening of the through openings is between 15% to 25% of the total area of the one or more shells including that of the through openings.

3. A fixed caliper according to claim 1, in which the slenderness of each of said one or more shells, expressed as the ratio of thickness to extension of the shell between said through openings in a circumferential direction relative to the axis of rotation of the brake disc is between 5/100 and 17/100.

4. A fixed caliper for a disc-brake comprising two side walls at a distance from each other which delimit a space suitable to accommodate a portion of a brake disc, in which one of said side walls comprises means for attaching the caliper to a vehicle so that said caliper is integral in rotation and in translation and the side walls are connected to each other by means of a connecting structure which straddles the disc space, in which each of said side walls delimits at least one seating capable of accommodating at least one pad and in which the caliper comprises thrust means capable of forcing the pads against the brake disc to clamp the pads, said thrust means being secured to said side walls in such a way that said side walls absorb the entire clamping force and said seatings being capable of securing the pads in such a way that the side walls also absorb the entire braking force applicable by the pads to the brake disc by friction, in which said connecting structure comprises one or more shells, arc-shaped or arranged along an arc, formed as a single integral structure having both side walls along outer circumferential edges thereof, in which the slenderness of said one or more shells expressed as the ratio of thickness to circumferential extension of said one or more shells relative to an axis of rotation of the brake disc is less than 17/100, wherein the radial thickness of all shells forming said connecting structure is constant along the entire circumferential extension of said connecting structure; and wherein said connecting structure extends substantially along an arc of circle having a radius of 180 mm to 220 mm, in which the average thickness of the shell is between 5 mm and 15 mm, and wherein the circumferential extension of said connecting structure corresponds to an angle of aperture of a sector of circle of between 100° and 130°.

5. A fixed caliper according to claim 4, in which the slenderness of the one or more shells in the area of the seatings for the pads, expressed as the ratio of thickness to axial extension relative to the axis of rotation of the brake disc is between 5/35 and 7/35.

6. A fixed caliper according to claim 4, in which the slenderness of the one or more shells in the areas of the walls outside the seatings for the pads, expressed as the ratio of thickness to axial extension relative to the axis of rotation of the brake disc is between 2/7 and 5/7.

7. A fixed caliper according to claim 4, in which the thickness of said one or more shells is substantially constant along the entire circumferential extension of the connecting structure.

8. A fixed caliper according to claim 4, in which the thickness of said one or more shells is substantially constant along the entire axial extension of the connecting structure.

9. A fixed caliper according to claim 4, in which said one or more shells is made in one piece with said side walls.

10. A fixed caliper according to claim 4, in which said connecting structure comprises a single shell which delimits at least one substantially circular through opening.

11. A fixed caliper according to claim 10, in which said single shell delimits three openings, substantially circular and equidistant from each other in a circumferential direction relative to the axis of rotation of the disc, and also arranged halfway between the two side walls.

12. A fixed caliper according to claim 11, in which said three openings are arranged substantially in the area of the caliper in which the seatings for the pads are located.

13. A fixed caliper according to claim 4, in which said connecting structure comprises:
two outer shells arranged at two opposite ends of the caliper, viewed in a circumferential direction of the brake disc, which connect respective ends of the side walls;
a central shell arranged approximately halfway between said outer shells which connects the side walls in the area of the seatings for the pads,
in which the connecting structure delimits between said central shell and each of said outer shells, a through opening having a circumferential extension less than the circumferential extension of the adjacent shells.

14. A fixed caliper according to claim 13, in which the circumferential extension of each of said through openings is less than or equal to half the circumferential extension of each of the adjacent shells.

15. A fixed caliper according to claim 13, in which said through openings are substantially rectangular.

16. A fixed caliper according to claim 15, in which the central shell delimits a further through opening arranged approximately at the centre of the central shell, said further through opening having a circumferential extension less than that of each of the portions of the central shell adjacent to said further through opening.

17. A fixed caliper for a disc-brake comprising two side walls at a distance from each other which delimit a space suitable to accommodate a portion of a brake disc, in which one of said side walls comprises means for attaching the caliper to a vehicle so that said caliper is integral in rotation and in translation and the side walls are connected to each other by means of a connecting structure which straddles the disc space, in which each of said side walls delimits at least one seating capable of accommodating at least one pad and in which the caliper comprises thrust means capable of forcing the pads against the brake disc to clamp the pads, said thrust means being secured to said side walls in such a way that said side walls absorb the entire clamping force and said seatings being capable of securing the pads in such a way that the side walls also absorb the entire braking force applicable by the pads to the brake disc by friction, in which said connecting structure comprises one or more shells, arc-shaped or arranged along an arc, formed as a single integral structure having both side walls along outer circumferential edges thereof, in which the slenderness of said one or more shells expressed as the ratio of thickness to circumferential extension of said one or more shells relative to an axis of rotation of the brake disc is less than 17/100, wherein the radial thickness of all shells forming said connecting structure is constant along the entire circumferential extension of said connecting structure;

wherein the circumferential extension of at least one of said shells is at least double its axial extension relative to the axis of rotation of the disc; and wherein said one or more shells delimit one or more through openings, in which the total area of opening of said through openings is less than 40% of the total area of the one or more shells including that of said through openings in which the slenderness of the entire connecting structure formed by said one or more shells, including the through openings, expressed as the ratio of thickness to circumferential extension of said entire connecting structure relative to the axis of rotation of the brake disc is between 2/100 and 4/100.

18. A fixed caliper according to claim 17, in which said one or more shells have a double curvature, concave viewed from the disc space, forming a first arc which extends transversely to a plane of the brake disc and a second arc which lies in said plane of the brake disc.

19. A fixed caliper according to claim 17, in which on the radially outer side of at least one of said shells a groove is made, capable of accommodating a pipe for fluid to pass between hydraulic cylinders arranged in the two side walls and embodying said thrust means.

20. A fixed caliper according to claim 17, in which each of the two side walls delimits three seatings for hydraulic cylinder/piston units which embody said thrust means, said three seatings being arranged on different circumferences relative to the axis of rotation of the brake disc.

21. A fixed caliper according to claim 20, in which said three seatings are arranged on circumferences with a radius decreasing in the direction of movement of the brake disc corresponding to forward travel of the vehicle.

22. A disc-brake having a fixed caliper comprising two side walls at a distance from each other which delimit a space suitable to accommodate a portion of a brake disc, in which one of said side walls comprises means for attaching the caliper to a vehicle so that said caliper is integral in rotation and in translation and the side walls are connected to each other by means of a connecting structure which straddles the disc space, in which each of said side walls delimits at least one seating capable of accommodating at least one pad and in which the caliper comprises thrust means capable of forcing the pads against the brake disc to clamp the pads, said thrust means being secured to said side walls in such a way that said side walls absorb the entire clamping force and said seatings being capable of securing the pads in such a way that the side walls also absorb the entire braking force applicable by the pads to the brake disc by friction, in which said connecting structure comprises one or more shells, arc-shaped or arranged along an arc, formed as a single integral structure having both side walls along outer circumferential edges thereof, in which the slenderness of said one or more shells expressed as the ratio of thickness to circumferential extension of said one or more shells relative to an axis of rotation of the brake disc is less than 17/100, wherein the radial thickness of all shells forming said connecting structure is constant along the entire circumferential extension of said connecting structure; and wherein said one or more shells delimit one or more through openings, in which the total area of opening of said through openings is less than 40% of the total area of the one or more shells including that of said through openings in which the slenderness of the entire connecting structure formed by said one or more shells, including the through openings, expressed as the ratio of thickness to circumferential extension of said entire connecting structure relative to the axis of rotation of the brake disc is between 2/100 and 4/100.

* * * * *